United States Patent
Ravishankar et al.

(10) Patent No.: US 12,294,445 B2
(45) Date of Patent: May 6, 2025

(54) SYSTEMS AND METHODS FOR A 5G BASED NGSO AIR INTERFACE

(71) Applicant: HUGHES NETWORK SYSTEMS LLC, Germantown, MD (US)

(72) Inventors: Channasandra Ravishankar, Clarksburg, MD (US); James Jehong Jong, North Potomac, MD (US); Gaguk Zakaria, College Park, MD (US); John E. Corrigan, III, Chevy Chase, MD (US)

(73) Assignee: HUGHES NETWORK SYSTEMS LLC, Germantown, MD (US)

( * ) Notice: Subject to any disclaimer, the term of this patent is extended or adjusted under 35 U.S.C. 154(b) by 369 days.

(21) Appl. No.: 17/863,467

(22) Filed: Jul. 13, 2022

(65) Prior Publication Data

US 2023/0047125 A1   Feb. 16, 2023

Related U.S. Application Data (60) Provisional application No. 63/233,734, filed on Aug. 16, 2021.

(51) Int. Cl.
| | | |
|---|---|---|
| *H04B 7/185* | (2006.01) | |
| *H04B 7/195* | (2006.01) | |
| *H04L 27/26* | (2006.01) | |
| *H04W 72/0453* | (2023.01) | |
| *H04W 88/16* | (2009.01) | |

(52) U.S. Cl.
CPC ..... *H04B 7/18589* (2013.01); *H04B 7/18515* (2013.01); *H04B 7/18573* (2013.01); *H04B 7/195* (2013.01); *H04L 27/2603* (2021.01); *H04W 72/0453* (2013.01); *H04W 88/16* (2013.01)

(58) Field of Classification Search
CPC ............ H04B 7/18589; H04B 7/18515; H04B 7/18573; H04B 7/195; H04B 7/18519; H04B 7/18541; H04B 7/18563; H04L 27/2603; H04W 72/0453; H04W 88/16; H04W 84/06
See application file for complete search history.

(56) References Cited

U.S. PATENT DOCUMENTS

| | | | |
|---|---|---|---|
| 10,574,437 B1 * | 2/2020 | Ye | .................... H04L 1/0045 |
| 2015/0063203 A1 | 3/2015 | Kim et al. | |
| 2015/0270890 A1 | 9/2015 | Vasavada et al. | |
| 2016/0274240 A1 * | 9/2016 | Wheatley | ................ G01S 19/02 |

(Continued)

OTHER PUBLICATIONS

International Search Report and Written Opinion issued Nov. 18, 2022 in corresponding PCT/US2022/040146.

(Continued)

*Primary Examiner* — Yu-Wen Chang
(74) *Attorney, Agent, or Firm* — Novo TechIP International PLLC (57) ABSTRACT

An improved air interface for satellite systems such as a 5G-based non-geostationary (NGSO) satellite system. The air interface includes an improved physical interface for efficient operation over NGSO satellite systems. The air interface includes an improved forward link for communicating from the satellite gateway to the user terminal and a return link for communicating from the user terminal to the satellite gateway.

19 Claims, 9 Drawing Sheets

(56) References Cited

U.S. PATENT DOCUMENTS

| | | | |
|---|---|---|---|
| 2017/0195101 | A1 | 7/2017 | Shahar |
| 2017/0366251 | A1 | 12/2017 | Ravishankar et al. |
| 2018/0375707 | A1* | 12/2018 | Bala .................... H04L 27/2605 |
| 2018/0376393 | A1* | 12/2018 | Wu .................... H04B 7/18521 |
| 2020/0036435 | A1 | 1/2020 | Ravishankar et al. |
| 2020/0099443 | A1 | 3/2020 | Ravishankar et al. |
| 2021/0092640 | A1 | 3/2021 | Ravishankar et al. |
| 2021/0144539 | A1 | 5/2021 | Edge et al. |
| 2021/0184764 | A1 | 6/2021 | Metzger et al. |
| 2021/0345273 | A1* | 11/2021 | Xing .................... H04W 56/006 |
| 2023/0179294 | A1* | 6/2023 | Kuang ................ H04B 7/2041 |
| | | | 370/316 |

OTHER PUBLICATIONS

International Search Report and Written Opinion issued Nov. 18, 2022 in related PCT/US2022/040154.

International Search Report and Written Opinion issued Nov. 18, 2022 in related PCT/US2022/040284.

Kibria, et al., "Carrier Aggregation in Satellite Communications: Impact and Performance Study", IEEE Open Journal of the Communications Society, IEEE, vol. 1, Sep. 9, 2020 (Sep. 9, 2020), pp. 1390-1402.

Lagunas, et al., "Dealing with Non-Uniform Demands in Flexible GEO Satellites: The Carrier Aggregation Perspective", 2020 10th Advanced Satellite Multimedia Systems Conference and the 16th Signal Processing for Space Communications Workshop (ASMS/SPSC), IEEE, Oct. 20, 2020 (Oct. 20, 2020), pp. 1-5.

Non-Final Office Action issued Oct. 17, 2024 in U.S. Appl. No. 17/879,399, filed Aug. 2, 2022.

\* cited by examiner

SYSTEMS AND METHODS FOR A 5G BASED NGSO AIR INTERFACE

BACKGROUND

The need for high-speed broadband network systems has become increasingly important throughout the world. Satellite systems, including non-geostationary (NGSO) satellite systems, can provide global high-speed data connectivity. However, existing systems may not readily integrate with existing terrestrial communication systems, such as 5G networks. Thus, there are significant areas needing new and improved mechanisms for enhanced satellite-based coverage and interface with terrestrial communications systems.

SUMMARY

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

An example implementation provides a satellite communication system comprising a user terminal with a user terminal physical layer interface; a satellite gateway with a gateway physical layer interface connected to a terrestrial network; an air interface for maintaining connectivity between the user terminal physical layer interface and the gateway physical layer interface through a satellite; the air interface comprising: a forward link for communicating from the satellite gateway to the user terminal; and a return link for communicating from the user terminal to the satellite gateway; wherein the forward link includes a frame with a plurality of sub-frames, the frame being aligned with a global positioning pulse signal from the satellite.

Another example implementation provides an air interface for maintaining connectivity through a satellite; the air interface comprising: a forward link for communicating from the satellite gateway to the user terminal; and a return link for communicating from the user terminal to the satellite gateway; wherein the forward link includes a frame with a plurality of sub-frames, the frame being aligned with a global positioning pulse signal from the satellite.

Another example implementation provides a satellite communication system comprising: a user terminal with a user terminal physical layer interface; a satellite gateway with a gateway physical layer interface connected to a terrestrial network; an air interface for maintaining connectivity between the user terminal physical layer interface and the gateway physical layer interface through a satellite; the air interface comprising: a forward link for communicating from the satellite gateway to the user terminal, wherein each frame of the forward link is 10 ms in duration and each sub-frame is 1 ms, wherein each sub-frame has 10 slots with each slot having a variable length code block, wherein the forward link includes a frame with a plurality of sub-frames with the frame aligned with a global positioning pulse signal from the satellite; and a return link for communicating from the user terminal to the satellite gateway, wherein the return link comprises a return link spectrum divided into carrier bands with each carrier band being divided into a plurality of return link carriers, wherein at least one of the return link carriers is further divided into narrow band carriers, and with at least one narrow band carrier added to each end of the plurality of return link carriers.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The instant disclosure provides systems and methods for an improved air interface for satellite systems such as a 5G-based non-geostationary (NGSO) satellite system. The air interface is based on terrestrial 5G protocols/waveforms. The systems and methods provided herein define an air interface and protocols at access stratum for efficient operation over NGSO systems. The air interface may maintain connectivity to standard terrestrial 5G Core Network and may also be used to support 4G-based systems. The air interface includes an improved forward link for communicating from the satellite gateway to the user terminal and a return link for communicating from the user terminal to the satellite gateway.

Figure 1:
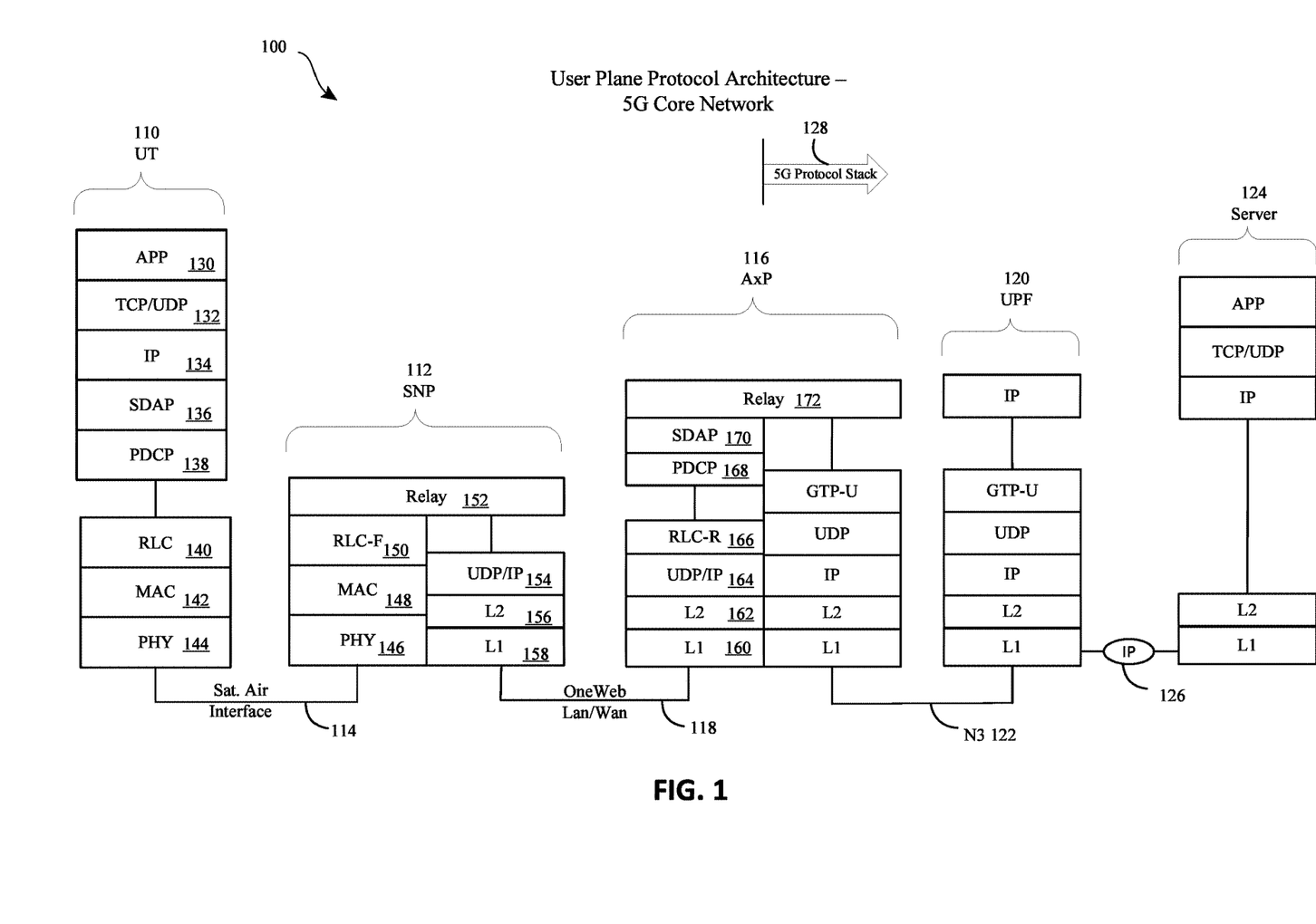
FIG. 1 illustrates a user plane protocol architecture for a 5G core network according to the disclosure.

FIG. 1 illustrates an example user plane protocol architecture 100 for a 5G core network. In this example, the user plane protocol architecture 100 supports communication from a user terminal (UT) to a server. The UT (not shown) communicates with a UT terminal protocol stack 110 to a satellite network portal (SNP) protocol stack 112 over a satellite air interface 114. The SNP communicates using the SNP protocol stack 112 to an anchor processor with an anchor processor (AxP) stack 116 over a LAN/WAN 118. The SNP and the anchor processor with their associated protocol stacks are typically part of a satellite gateway. The SNP may be located at the same location or separate locations connected by the LAN/WAN 118. The anchor processor with the anchor processor stack 116 is connected to a user plane function (UPF) with a UPF protocol stack 120 over an N3 network connection 122 in a manner that is typical for a 5G network. The N3 interface is a standard interface in 5G networks that performs the role of conveying user data from a 5G radio access network (RAN) to the UPF. The UPF with a UPF protocol stack 120 communicates with the server and the server protocol stack 124 over the internet protocol (IP) network 126. From the downlink portion of the AxP stack 116 to the server protocol stack 124, indicated by arrow 128, the user plane protocols may utilize standard terrestrial 5G protocol stacks as known in the art.

The UT protocol stack 110 includes, from top to bottom, an application block 130, a transmission control protocol/ user datagram protocol (TCP/UDP) block 132, an internet protocol (IP) block 134, a service data adaption protocol (SDAP) block 136, a packet data convergence protocol (PDCP) block 138, a radio link control (RLC) block 140, a medium access control (MAC) block 142 and a physical layer (PHY) block 144. The user plane protocol stack in the SNP includes a physical layer (PHY) block 146, a MAC layer block 148, an RLC-F block 150, a relay block 152, a UDP/IP block 154, an L2 block 156 and an L1 block 158. The AxP protocol stack 116 includes an L1 block 160, an L2 block 162, UDP/IP block 164, an RLC-R block 166, a PDCP block 168, a SDAP block 170 and a relay block 172. The remaining protocol blocks in the AxP 116, the UPF 120, and the server 124 may utilize standard protocol blocks.

Figure 2:
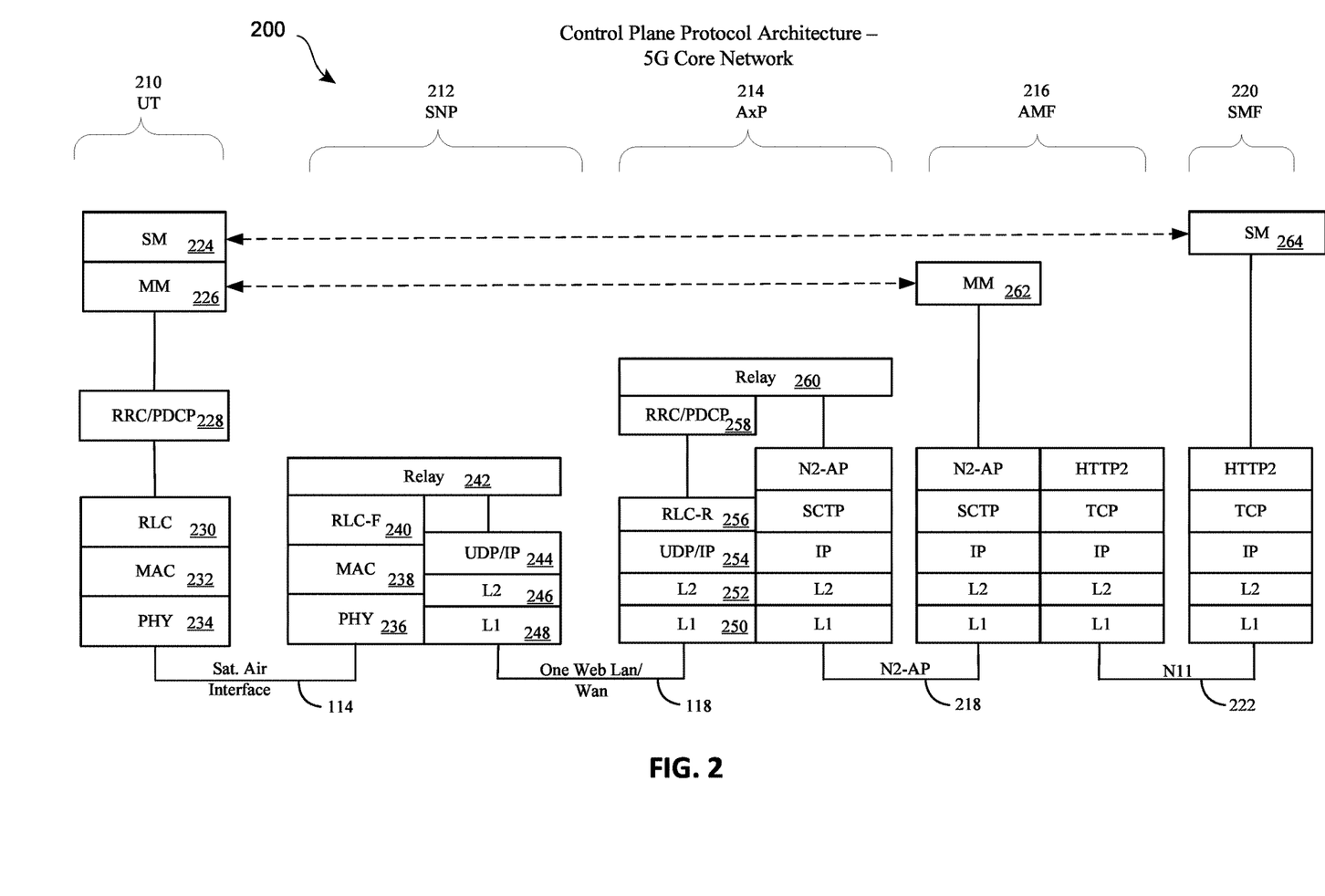
FIG. 2 illustrates a control plane protocol architecture for a 5G core network according to the disclosure.

FIG. 2 illustrates a control plane protocol architecture 200 for a 5G core network according to the disclosure. Similar as above, the control plane protocol architecture 200 supports communication from a UT to a server. The UT (not shown) communicates with a UT terminal protocol stack 210 to a satellite network portal (SNP) protocol stack 212 over the satellite air interface 114. The SNP communicates using the SNP protocol stack 212 to an anchor processor with an anchor processor (AxP) stack 214 over a LAN/WAN 118 such as OneWeb. The anchor processor with the anchor processor stack 214 is connected to an access mobility management function (AMF) with an AMF protocol stack 216 over a an N2-AP network connection 218 in a manner that is typical for a 5G network. The N2-AP interface 218 is a standard interface in 5G networks. The AMF with the AMF protocol stack 216 communicates with a session management function 220 over the N11 network 222. From the downlink portion of the AxP stack 214 to the SMF protocol stack 220, the user plane protocols may utilize standard terrestrial 5G protocol stacks as known in the art.

The UT control plane protocol stack 210 includes, from top to bottom, an SM block 224, a MM block 226, a radio resource control (RRC)/PDCP block 228, a radio link control (RLC) block 230, a medium access control (MAC) block 232 and a physical layer (PHY) block 234. The control plane protocol stack in the SNP includes a physical layer (PHY) block 236, a MAC layer block 238, an RLC-F block 240, a relay block 242, a UDP/IP block 244, an L2 block 246 and an L1 block 248. The AxP protocol stack 214 includes an L1 block 250, an L2 block 252, UDP/IP block 2544, an RRC/PDCP block 258, and a relay block 260. The SM block 224 of the UT protocol stack 210 communicates with an associated SM block 264 of the SMF protocol stack 220, and the MM block 226 of the UT protocol stack 210 communicates with an associated MM block of the AMF protocol stack 216. The remaining protocol blocks in the AxP 116, the AMF 216, and the SMF 20 may utilize standard protocol blocks. The SM blocks 224, 264 and the MM blocks 226, 262 are part of a Non-access stratum in 4G and 5G networks. In the examples herein, the SM blocks and MM blocks may operate as known in the prior art.

Figure 3A:
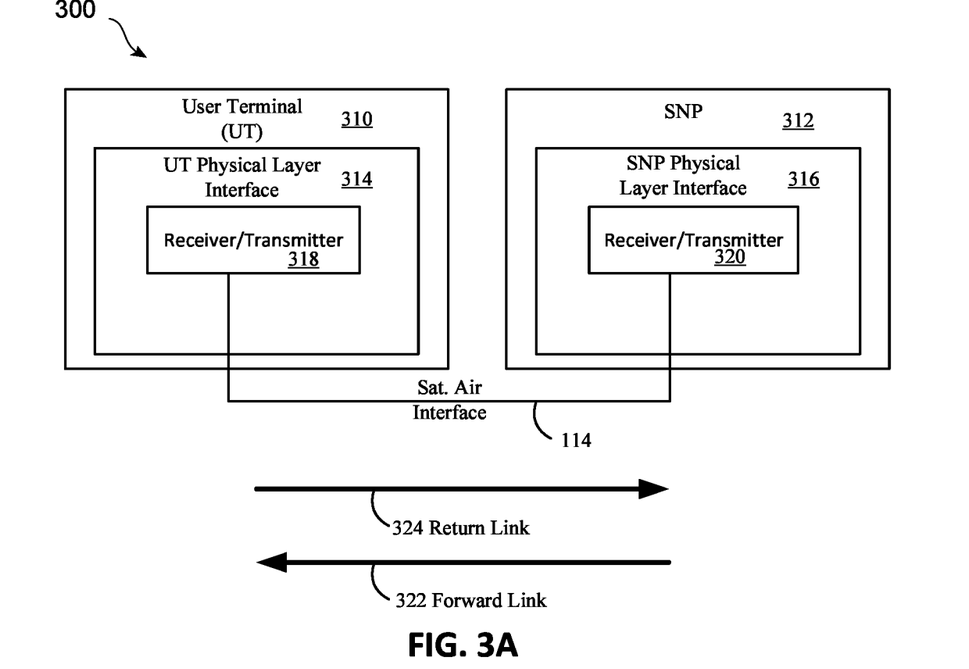
FIG. 3A is a block diagram of an example physical layer connection between a UT and the SNP.

FIG. 3A is a block diagram of an example physical layer connection 300 for a satellite communication system between a ground-based user terminal (UT) 310 and the SNP 312 on a satellite gateway (not shown). The physical layer connection 300 includes a UT physical layer interface 314 on the UT 310 connected to an SNP physical layer interface 316 on the SNP 312 over the satellite air interface 114. The UT physical layer interface 310 is part of a user terminal 310 of the satellite communication system. The SNP physical layer interface 312 is part of the SNP 312 on the gateway of the satellite communication system. The UT physical layer interface 314 and the SNP physical layer interface 316 each include a receiver/transmitter 318, 320. The UT physical layer interface 314 and the SNP physical layer interface 316 provide hardware support of the PHY protocol stacks 144, 146, 234, 236 described above with reference to FIG. 1 and FIG. 2. The satellite air interface 114 includes forward link communication 322 and return link communication 324. The forward link 322 includes communication over the air interface 114 from the SNP to the UT. The return link 324 includes communication over the air interface 114 from the UT to the SNP. The forward link communication 322 and the return link communication is described further below.

Figure 3B:
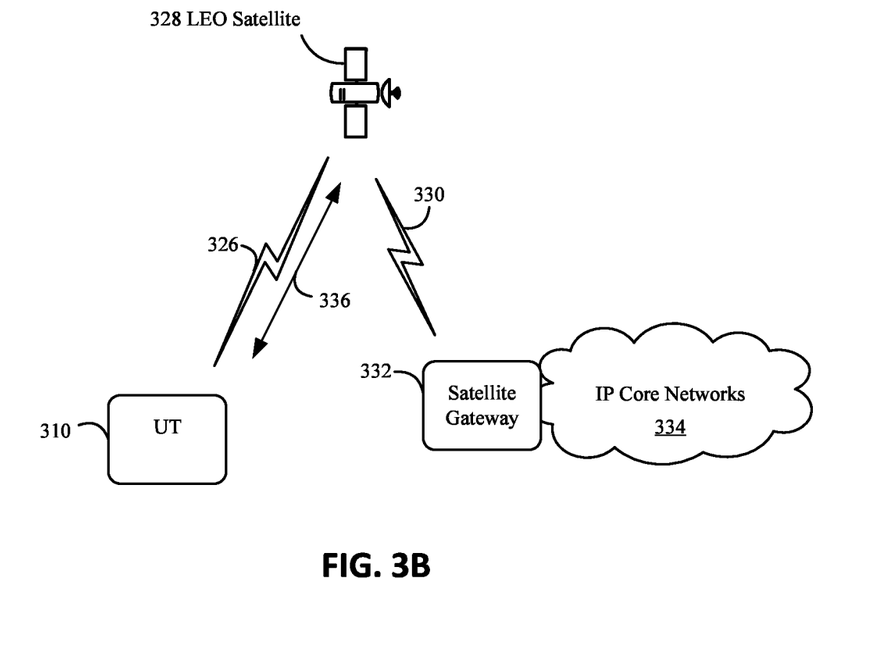
FIG. 3B is a block diagram of a satellite view of the physical layer connection.

FIG. 3B is a block diagram of a satellite view of the physical layer connection 300. The physical layer connection 300 is part of and provides the connection for the air interface 114 described above. The physical layer connection 300 includes communication 326 to and from a UT 310 to a satellite such as LEO satellite 328. The physical layer connection 300 further includes communication 330 between the satellite 328 and a satellite gateway 332. The satellite gateway 332 includes the SNP 312 shown in FIG. 3A. The satellite gateway 332 is connected to the various parts of an IP core network 334 as shown in FIGS. 1 and 2. The communication 326 between the UT 310 and the satellite 328 typically includes a pulse signal 336 to communicate global positioning system (GPS) information. The pulse signal 336 is typically one pulse per second. This GPS pulsed signal 336 is used herein to create and align the forward link frame structure as described below with reference to FIG. 6.

Figure 4:
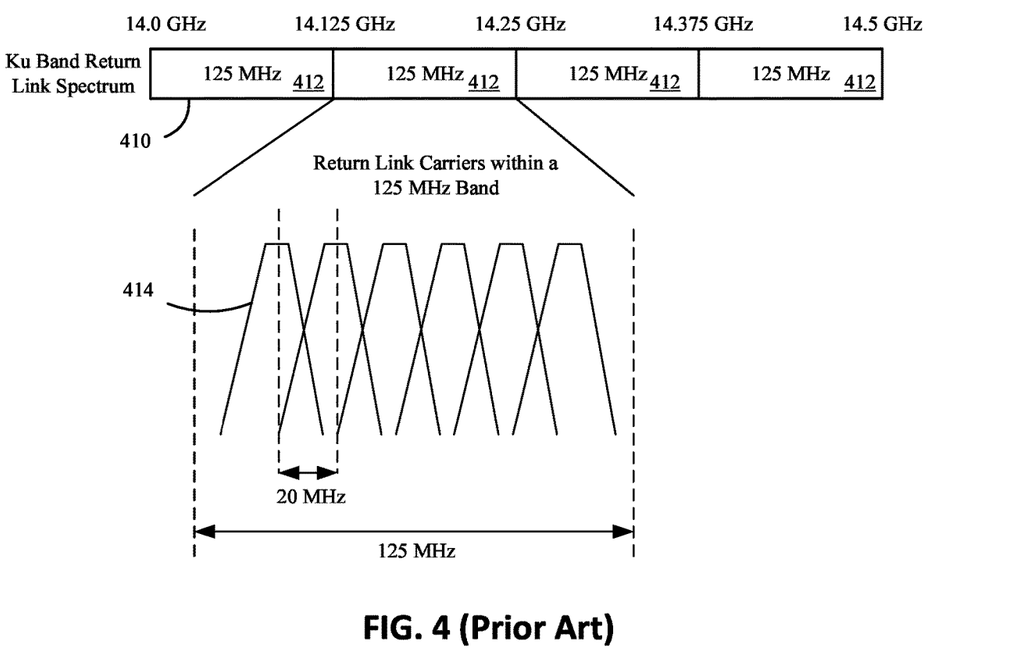
FIG. 4 is a diagram representing a return link spectrum according to the prior art.

FIG. 4 is a diagram representing a return link spectrum according to the prior art. In this example, the return link spectrum is a Ku carrier band that carries data between a satellite and the UT. The KU band return link spectrum 410 in the illustrated example spans from 14.0 GHz to 14.5 GHZ. The return link spectrum 410 is divided into four 125 MHz carrier bands 412. Each 125 MHz carrier band 412 is divided into six 20 MHz return link carriers 414. Each of the 20 MHz return link carriers 414 is used to transmit data on a satellite link as known in the prior art.

Figure 5A:
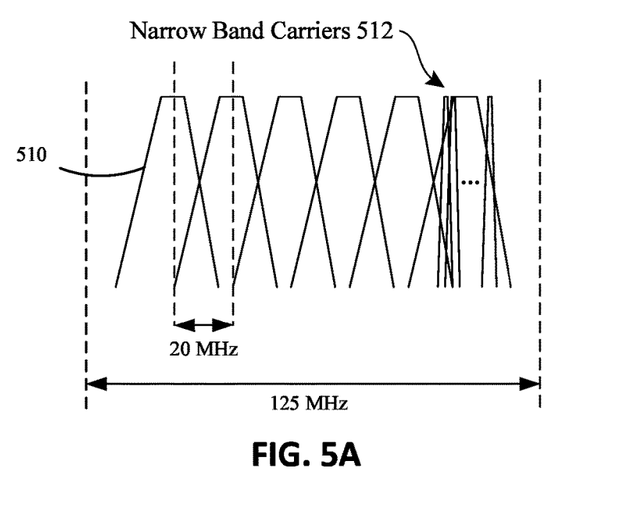
FIG. 5A illustrates narrow band carriers added into the return link spectrum according to disclosed embodiments.

FIG. 5A illustrates narrow band carriers added into the return link spectrum according to disclosed embodiments. Like the prior art example in FIG. 4, the KU band return link spectrum is divided into 125 MHz carrier bands. Each 125 MHz carrier band may be further divided into return link carriers 510. The return link carriers may be used to transmit data on a satellite return link. In this example, the 125 MHz carrier band is divided into six 20 MHz return link carriers 510. To improve efficiency and effective use of the return link carriers, the return link carriers may be further divided. In the illustrate example in FIG. 5A, the sixth 20 MHz return link carrier is further divided into multiple narrow band carriers 512. In an embodiment, the sixth 20 MHz return link carrier is divided into 10 narrow band carriers 512. The narrow band carriers can be allocated to more efficiently use the bandwidth of the 20 MHz return link carrier.

Figure 5B:
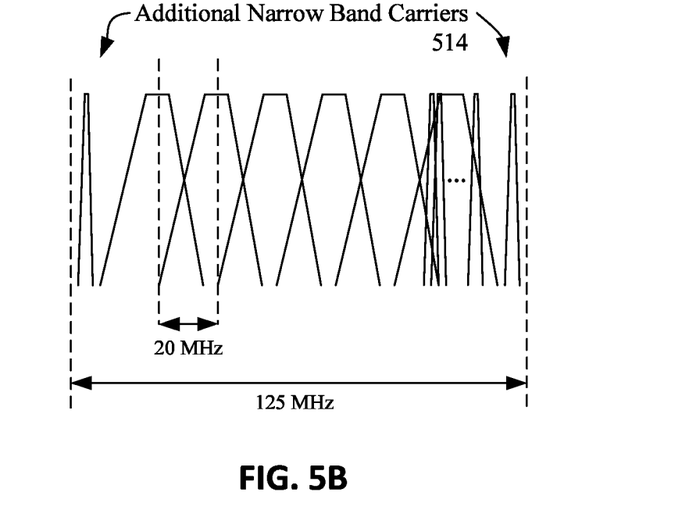
FIG. 5B illustrates additional band carriers added to the return link spectrum according to disclosed embodiments.

FIG. 5B illustrates additional band carriers added to the return link spectrum according to disclosed embodiments. As in the previous example, the KU band return link spectrum is divided into 125 MHz carrier bands. Each 125 MHz carrier band may be further divided into return link carriers 510 to transmit data on a satellite return link. Like the above, the 125 MHz carrier band may be divided into six 20 MHz return link carriers 510. In addition to the six 20 MHz return link carriers, additional narrow band carriers 514 may be added at either end of the 20 MHZ return link carrier. In this example, one additional narrow band carrier 514 is added at each end of the return link carrier. The additional narrow band carrier may be about 5 MHz. The additional narrow band carriers can be allocated to more efficiently use the bandwidth of the 125 MHz carrier band. The additional narrow band carriers 514 may be used in conjunction with one or more of the 20 MHz return link carrier divided into narrow band carriers as described above.

Figure 6A:
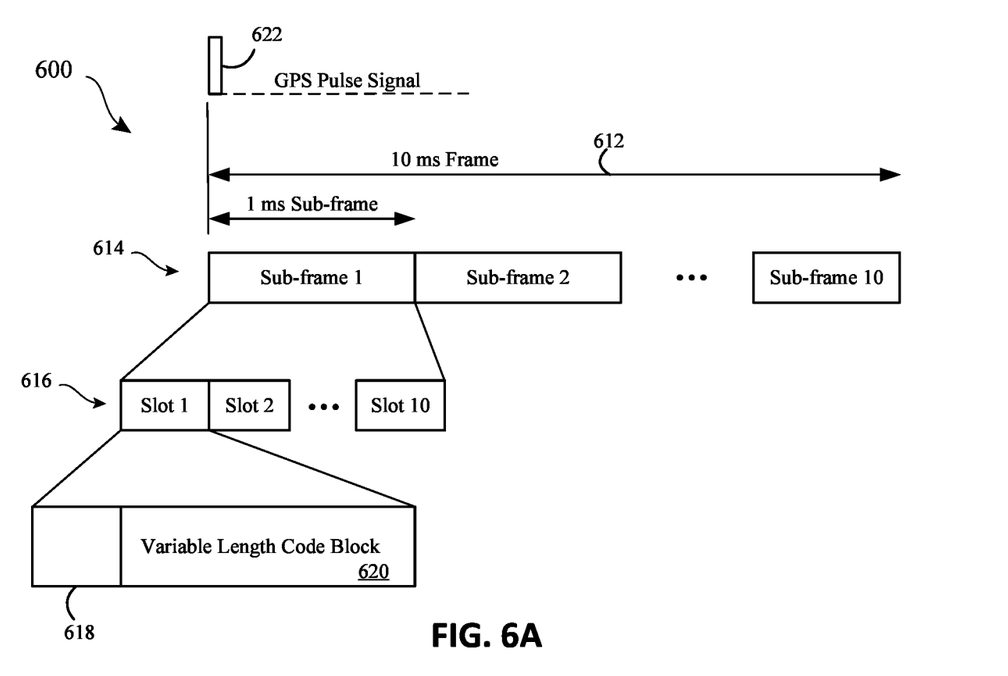
FIG. 6A is a diagram of an example forward link frame structure.

FIG. 6A is a diagram of an example forward link frame structure 600 according to embodiments herein. The forward link frame structure 600 illustrates the organization of data encoded on a carrier. The frame structure 600 in an embodiment includes a 10 ms frame 612 divided into 1 ms sub-frames 614. Each 1 ms sub-frame may be further divided into slots 616 as shown. In this example, each 1 ms sub-frame 614 is divided into 10 slots 616. Each of the slots 616 may contain header information 618 and variable length code blocks 620. The 1 ms sub-frames 614 may be advantageously aligned to Global Position System (GPS) by aligning the sub-frames 614 to time markers of the GPS pulse signal 622 to preserve satellite duty cycling. The GPS pulse signal 622 may be a one pulse per second (PPS) GPS signal. Timing may be synchronized with a local clock (not shown). Using GPS based markers allows the satellite, Gateway and User Terminal to be synchronized as GPS satellites are visible to all three entities. The GPS time markers are derived from signals received from navigation satellites such as GPS or Global Navigational Satellite System (GLONASS) satellites as shown and described above with reference to FIG. 3B. The forward link frame structure 600 is able to achieve a wide band carrier such as 238 Msps symbol rate with about 5% roll-off on a 250 MHz sub-carrier spacing.

Figure 6B:
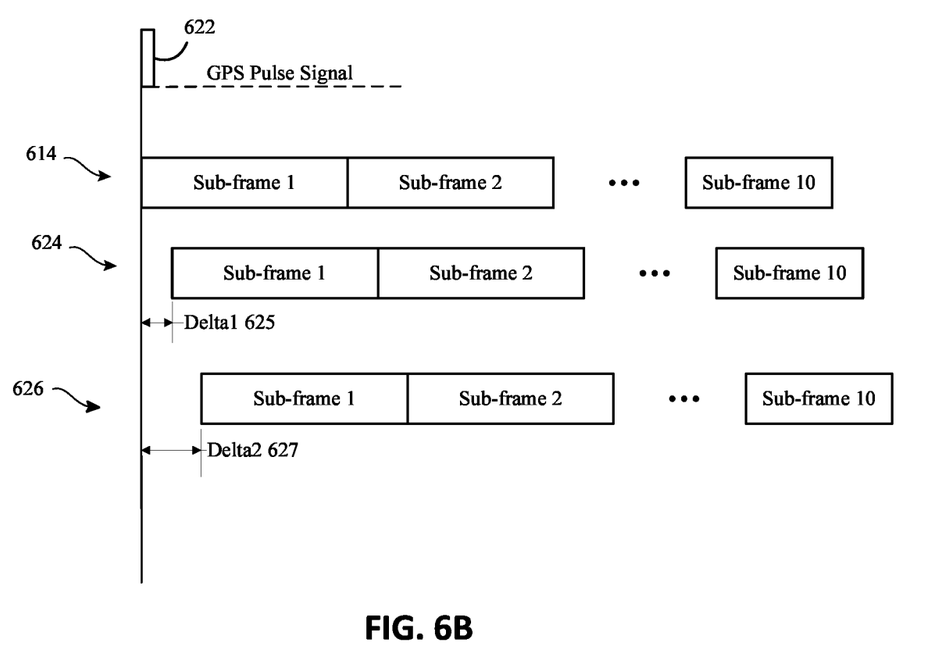
FIG. 6B is a diagram of an example forward link sub-frame structure where sub-frames are offset in time relative to the GPS pulse signal.

FIG. 6B is a diagram of an example forward link sub-frame structure where sub-frames are offset in time relative to the GPS pulse signal. In FIG. 6A, sub-frames were shown aligned to time markers of a GPS pulse signal. In the example of FIG. 6B, other sub-frames can be started at different offsets from the GPS pulse signal 622. In this example, a first set of sub-frames 614 is aligned to the GPS pulse signal 622 as shown above. A second set of sub-frames 624 is offset from the GPS pulse signal 622 by a time of delta1 625. Similarly, a third set of sub-frames 626 is offset from the GPS pulse signal 622 by a time of delta2 627. Delta1 625 and delta2 627 may be an appropriate time offset such as 0.1 ms.

Figure 6C:
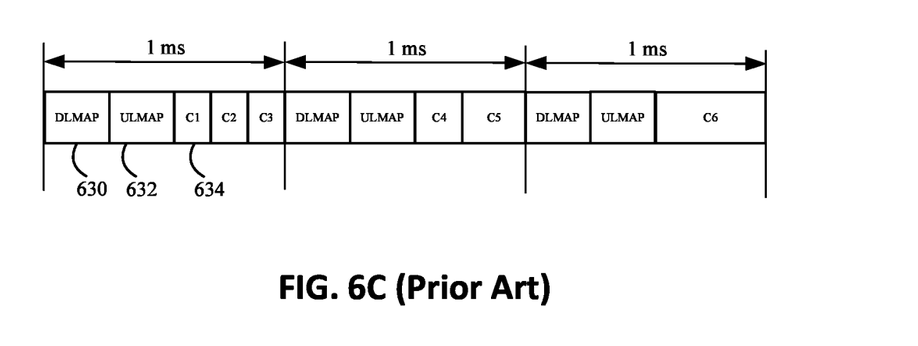
FIG. 6C is a diagram of an example forward link sub-frame structure according to the prior art.

FIG. 6C illustrates an example forward link sub-frame structure according to the prior art. The frame structure contains a downlink map (DLMAP) 630, an uplink map (ULMAP) 632 and a number of code blocks 634. In this example, the first subframe has code blocks 634 identified as C1, C2 and C3. The DLMAP 630 carries information about what user's data is present in the frame and how the data is coded. The ULMAP 632 carries information about—which user is allocated uplink resources to transmit. The code blocks 634 are blocks of information in the forward link. Each 1 ms frame can carry a different number of code blocks 634 depending on the size of the code blocks as shown in FIG. 6B.

In FIG. 6C, the coding scheme used depends on the estimated signal quality for the users and the amount of data transmitted to the users. The DLMAP carries the ID of the users for which data is carried in the downlink (or forward link), the size of the code block and the coding scheme used. The DLMAP itself is coded in the most robust manner since it has to be decodable by all users. The size of the DLAMP is fixed. The ULMAP is also strongly coded and includes the ID of the users to which an uplink allocation is made. It also contains the number of resources allocated to the users. In addition, the traditional code blocks 634 are size such that an integer number of code blocks 632 can fit in a 1 ms frame. This means that if one user's data is to be transmitted, the data has to be such that the code block completes in one 1 ms frame. If this user has more downlink data, it must be transmitted in a subsequent code block.

Figure 6D:
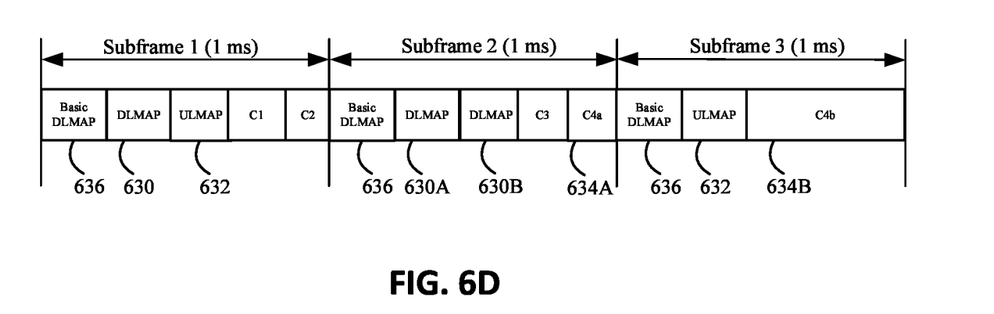
FIG. 6D is a diagram of an example forward link sub-frame structure.

FIG. 6D illustrates an example forward link sub-frame structure according to the claimed invention. The frame structure contains a Basic DLMAP 636 as further described herein. Each sub-frame in the frame structure also may include none or multiple DLMAPs 630 and may include a ULMAP 632 along with a number of code blocks 634A, 634B similar to those described above. In this example, the sub-frames include code blocks C1, C2, C3, C4*a* and C4*b* as shown. The Basic DLMAP 636 introduced here is a very short DLMAP included in each 1 ms sub-frame. The Basic DLMAP 636 contains information on whether additional DLMAPs and a ULMAP are present in the sub-frame. The Basic DLMAP 636 may indicate there are no DLMAPs or several DLMAPs in the sub-frame. Further, the Basic DLMAP 636 may indicate the presence or absence of a ULMAP 632. In the illustrated example shown in FIG. 6C, sub-frame 1 has one DLMAP 630 and one ULMAP 632. The subframe 2 has two DLMAPs 630A, 630B and no ULMAP. And sub-frame 3 has zero DLMAPs.

The Basic DLMAP 636 is smaller in size and allows allocating DLMAPs and a ULMAP only when needed. If no DLMAP or ULMAP is needed, the space in the sub-frame normally used for the DLMAP and ULMAP can be allocated to code blocks to carry user information. No DLMAP may be needed, for example, when a user's data does not fit in the current sub-frame. In this example, user data C4*a* 634A and C4*b* 634B belong to user 3 and to the same code block as shown. The combined data of C4*a* 634A and C4*b* 634B does not fit in a single frame but can be accommodated in multiple frames. The absence of a DLMAP in sub-frame 3 allows additional user code data to fit in the subframe. The larger code block of C4A and C4B that spans across multiple sub-frames provides better error rate performance.

Figure 6E:
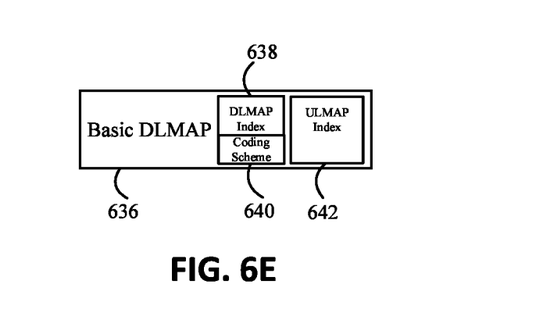
FIG. 6E is a diagram of an example Basic DLMAP structure.

FIG. 6E illustrates an example of the Basic DLMAP 636 described above that contains information on DLMAPs and a ULMAP are present in the sub-frame. In this example, the Basic DLMAP 636 incudes a DLMAP index 638 and coding scheme 640 for the DLMAPs in the DLMAP index 638, and a ULMAP index 642. The DLMAP index 638 includes a bit or other data to indicate the number of DLMAPs included in the subframe. Similarly, the coding scheme may include a single bit or other data to indicate the coding scheme used for one or more DLMAPs in the sub-frame. The DLMAP index 638 may also include a bit or other data that indicate the size of the DLMAPs in the sub-frame. The Basic DLMAP 636 may further include a ULMAP index 642 that includes a bit or other data to indicate whether a ULMAP is included in the sub-frame. The size, order and coding type may be arranged in any suitable manner in the Basic DLMAP. The coding scheme for the DLMAPs in the sub-frame can be optimized for the user's link condition. There is no need for robust coding of the Basic DLMAP resulting in increased efficiency.

The detailed examples of systems, devices, and techniques described in connection with FIGS. 1-8 are presented herein for illustration. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-8 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
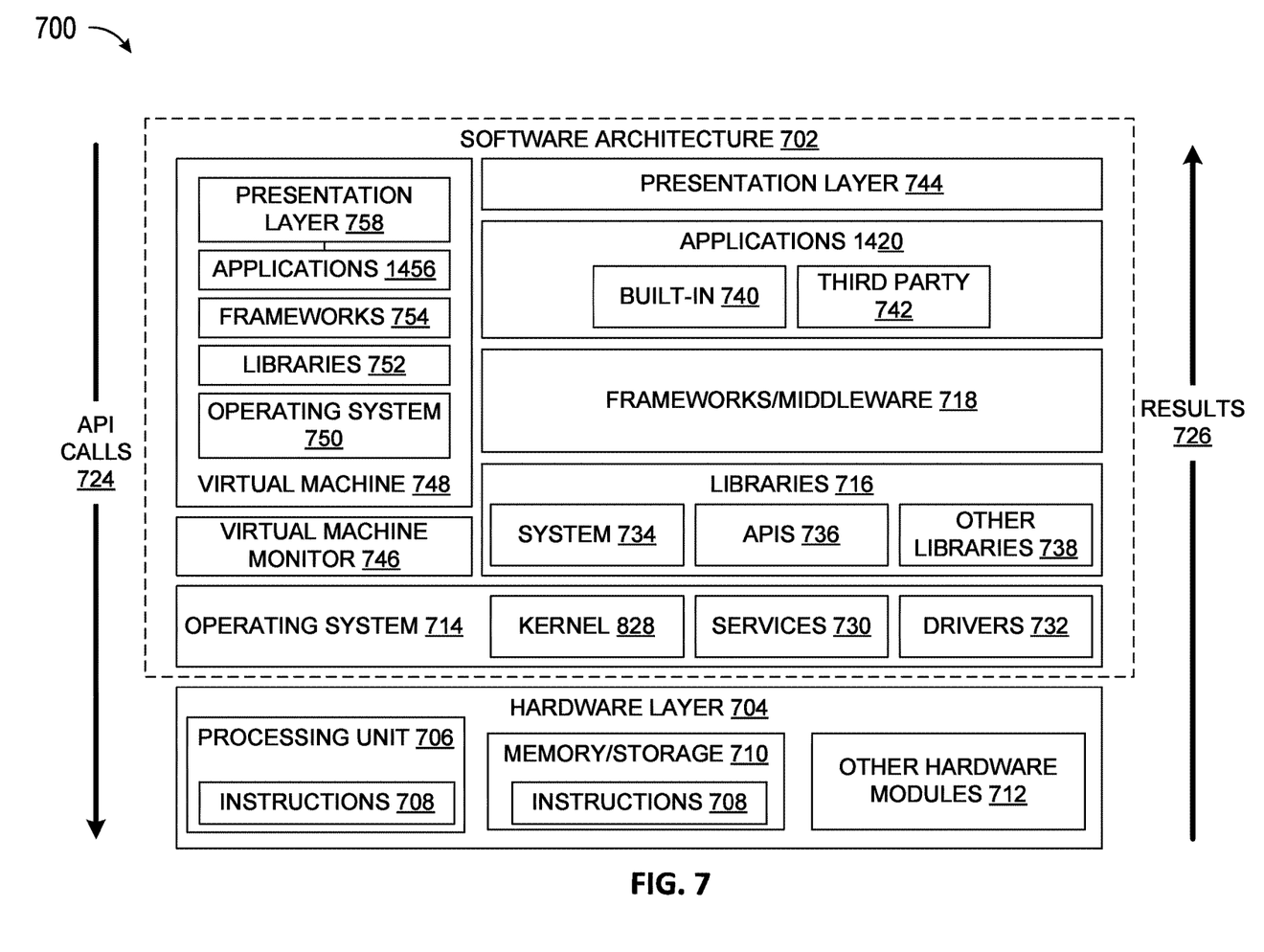
FIG. 7 is a block diagram showing an example software architecture, various portions of which may be used in conjunction with various hardware architectures herein described, which may implement any of the features described herein.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 708 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 714, libraries 772, frameworks 754, applications 756, and/or a presentation layer 758.

Figure 8:
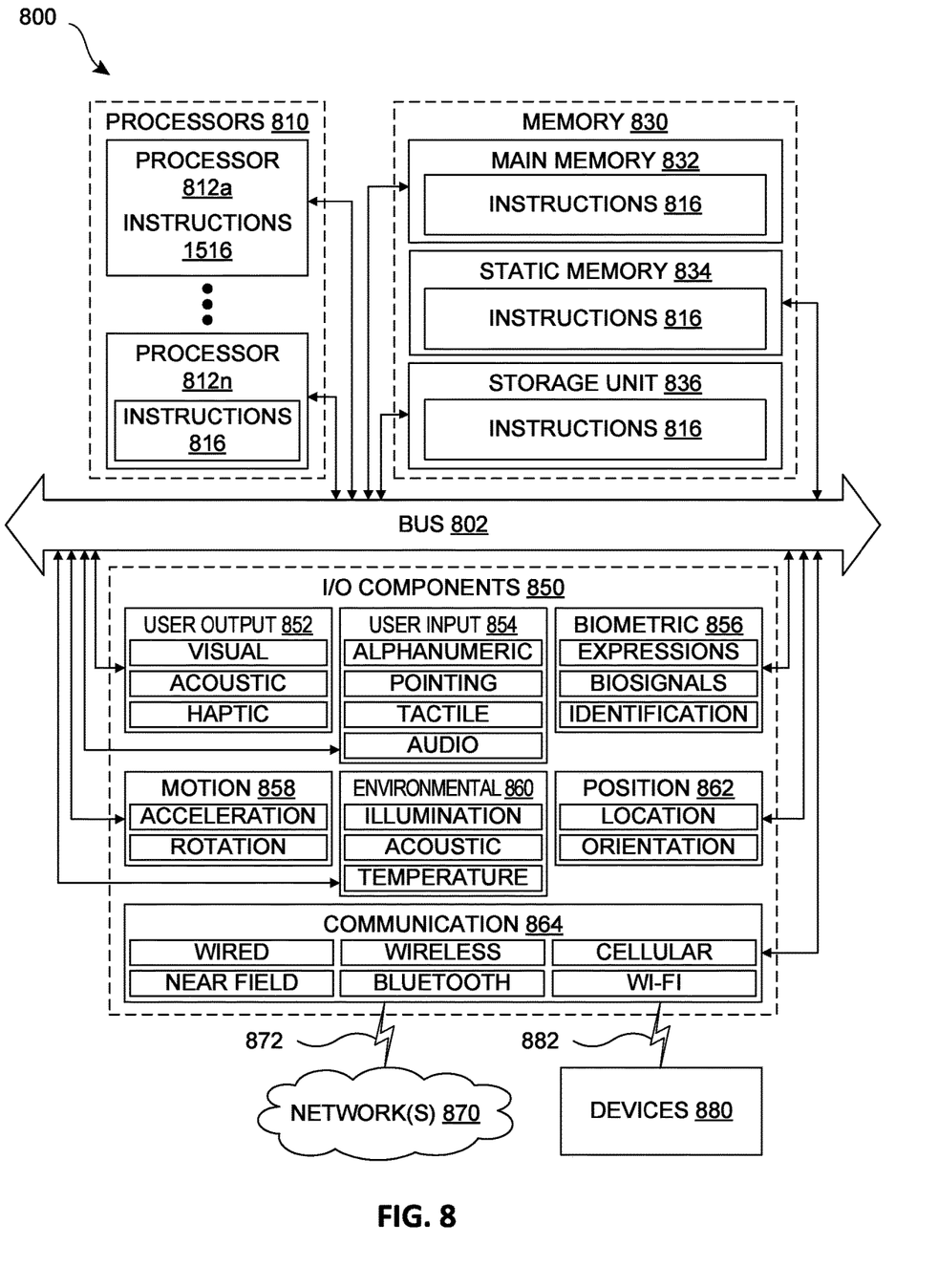
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812*a* to 812*n* that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A satellite communication system comprising:
a user terminal with a user terminal physical layer interface;
a satellite gateway with a gateway physical layer interface connected to a terrestrial network;
an air interface for maintaining connectivity between the user terminal physical layer interface and the gateway physical layer interface through a satellite, wherein the air interface includes:
a forward link for communicating from the satellite gateway to the user terminal;
a return link for communicating from the user terminal to the satellite gateway;
wherein the forward link includes a frame with a plurality of sub-frames, the frame being aligned with a global positioning pulse signal from the satellite; and
wherein the plurality of sub-frames include a basic down link map (Basic DLMAP) with a downlink index, wherein the downlink index includes an indication for a number of DLMAPS included in a sub-frame, and a uplink map index that includes an indication whether the sub-frame includes an uplink map.

2. The satellite communication system of claim 1, wherein a slot of each frame of the forward link is 10 ms in duration, and each sub-frame is 1 ms in duration with 10 slots, each slot having a variable length code block.

3. The satellite communication system of claim 1, wherein each sub-frame is aligned to a GPS pulse signal with a delta time offset.

4. The satellite communication system of claim 1, wherein the return link comprises a return link spectrum divided into carrier bands, each carrier band being divided into a plurality of return link carriers, wherein at least one of the return link carriers is further divided into narrow band carriers.

5. The satellite communication system of claim 4, further comprising at least one narrow band carrier added to each end of the plurality of return link carriers.

6. The satellite communication system of claim 4, wherein the carrier bands are 125 MHz, and the plurality of return link carriers are 20 MHz in bandwidth.

7. The satellite communication system of claim 6, wherein the carrier bands are 125 MHz, the plurality of return link carriers are 20 MHz, and the narrow band carriers are less than 20 MHz.

8. The satellite communication system of claim 1, wherein the Basic DLMAP further comprises an indication for a coding scheme for any DLMAPs included in the sub-frame.

9. An air interface for maintaining connectivity through a satellite; the air interface comprising:

a forward link for communicating from a satellite gateway to a user terminal;

a return link for communicating from the user terminal to the satellite gateway;

wherein the forward link includes a frame with a plurality of sub-frames, the frame being aligned with a global positioning pulse signal from the satellite; and wherein the plurality of sub-frames include a basic down link map (Basic DLMAP) with a downlink index, wherein the downlink index includes an indication for a number of DLMAPs included in a sub-frame, and a uplink map index that includes an indication whether the sub-frame includes an uplink map.

10. The air interface of claim 9, wherein each frame of the forward link is of 10 ms duration and each sub-frame is of 1 ms duration.

11. The air interface of claim 10, wherein each sub-frame has 10 slots, each slot having a variable length code block.

12. The air interface of claim 9, wherein the return link comprises a return link spectrum divided into carrier bands, each carrier band being divided into a plurality of return link carriers, wherein at least one of the return link carriers is further divided into narrow band carriers.

13. The air interface of claim 12, further comprising at least one narrow band carrier added to an end of the plurality of return link carriers.

14. The air interface of claim 12, wherein the carrier bands are 125 MHZ, and the plurality of return link carriers are 20 MHz.

15. The air interface of claim 14, wherein the narrow band carriers are less than 20 MHz.

16. The air interface of claim 13, wherein the carrier bands are 125 MHz, the plurality of return link carriers are 20 MHz, and the narrow band carriers are less than 20 MHz.

17. A satellite communication system comprising:
a user terminal with a user terminal physical layer interface;
a satellite gateway with a gateway physical layer interface connected to a terrestrial network;
an air interface for maintaining connectivity between the user terminal physical layer interface and the gateway physical layer interface through a satellite; the air interface comprising:
a forward link for communicating from the satellite gateway to the user terminal, wherein each frame of the forward link is 10 ms in duration and each sub-frame is 1 ms, wherein each sub-frame has 10 slots with each slot having a variable length code block, wherein the forward link includes a frame with a plurality of sub-frames with the frame aligned with a global positioning pulse signal from the satellite;
a return link for communicating from the user terminal to the satellite gateway, wherein the return link comprises a return link spectrum divided into carrier bands with each carrier band being divided into a plurality of return link carriers, wherein at least one of the return link carriers is further divided into narrow band carriers, and with at least one narrow band carrier added to each end of the plurality of return link carriers; and
wherein each sub-frame includes a basic down link map (Basic DLMAP) with a downlink index, wherein the downlink index includes an indication for a number of DLMAPs included in a sub-frame, and a uplink map index that includes an indication whether the sub-frame includes an uplink map.

18. The satellite communication system of claim 17, wherein the carrier bands are 125 MHz and the plurality of return link carriers are 20 MHz.

19. The satellite communication system of claim 18, wherein the narrow band carriers are less than 20 MHz in bandwidth.

* * * * *